(12) United States Patent
Britten

(10) Patent No.: US 7,576,332 B2
(45) Date of Patent: Aug. 18, 2009

(54) IMAGING SYSTEM

(75) Inventor: Alan Britten, London (GB)

(73) Assignees: St. George's Healthcare NHS Trust, London (GB); Southern Scientific Limited, West Sussex (GB); Care Wise Medical Products Corporation, Morgan Hill, CA (US)

(*) Notice: Subject to any disclaimer, the term of this patent is extended or adjusted under 35 U.S.C. 154(b) by 136 days.

(21) Appl. No.: 10/565,687

(22) PCT Filed: Jul. 30, 2003

(86) PCT No.: PCT/GB04/03295

§ 371 (c)(1),
(2), (4) Date: Sep. 18, 2006

(87) PCT Pub. No.: WO2005/012945

PCT Pub. Date: Feb. 10, 2005

(65) Prior Publication Data

US 2007/0023671 A1 Feb. 1, 2007

(30) Foreign Application Priority Data

Aug. 1, 2003 (GB) .................... 0318081.7

(51) Int. Cl.
G01T 1/00 (2006.01)

(52) U.S. Cl. ...................................... 250/393

(58) Field of Classification Search .................. 250/393
See application file for complete search history.

(56) References Cited

U.S. PATENT DOCUMENTS

2001/0056234 A1 12/2001 Weinberg
2002/0133097 A1 9/2002 Leitner et al.

FOREIGN PATENT DOCUMENTS

EP 0 376 873 7/1990
WO 02/16965 2/2002

*Primary Examiner*—David P Porta
*Assistant Examiner*—Mindy Vu
(74) *Attorney, Agent, or Firm*—Renner, Otto, Boisselle & Sklar, LLP

(57) ABSTRACT

The invention provides an imaging system using an inherently non-imaging detection probe, linked to a, position and optional contact-sensing device, for use in scanning a surface having a surface radiation flux. The system has processing means to take signals from the detection probe and sensing devices, and to create an image of the geometry of the surface, and of the surface radiation flux. The system also provides means to determine the depth of a radiation source below the surface. The system also has means to present this image to a user.

7 Claims, 2 Drawing Sheets

IMAGING SYSTEM

This application is a national phase of International Application No. PCT/GB2004/003295 filed Jul. 30, 2004 and published in the English language.

FIELD OF THE INVENTION

The invention relates to radiation flux imaging systems to measure, process and display to a user the geometry and surface radiation flux of a surface to be imaged.

BACKGROUND AND REVIEW OF THE ART KNOWN TO THE APPLICANT

Hand-held non-imaging scintillation detectors are used for a number of applications in industry and medicine. These range from contamination monitoring, used to detect radioactive contamination on surfaces or personnel, to use on humans during operations to guide surgeons to areas of high radiopharmaceutical uptake. The high uptake may indicate tumour activity, as in radiolabelled monoclonal antibody work, or a particular organ (eg. parathyroid or lymph node). These 'intraoperative gamma probes' have increased in use over the last few years due to the development of a surgical staging technique known as 'sentinel node biopsy'. This is a method of guiding a surgeon to a lymph node, or nodes, which drains a tumour. Tumours may spread through the lymphatic system and, since lymph nodes may filter out tumour cells travelling in lymph fluid, the first node on the draining lymphatic system is 'sentinel'—standing on guard against tumour spread.

If the surgeon can remove the sentinel nodes, then the pathologist can closely examine these, and if free from tumour then it is postulated that this shows that tumour has not spread. The patient treatment is therefore planned based upon this staging knowledge, and this technique has been applied most widely for breast cancer, melanoma, and increasingly in other areas (e.g. colorectal).

A number of such intraoperative gamma probes are known, which produce data relating to local gamma radiation flux. These data are often presented in the form of an audible tone or the display of a numerical value. Furthermore, the data generated is highly dependent on the orientation of the hand-held probe in relation to the surface of a patient, leading to inadequate accuracy of localisation of a radiation source. The problem is compounded by the often-encountered low radiation flux, and high background radiation from sources such as the injection site. Also, the presence of several discrete sources in close proximity to each other further reduces the utility of such non-imaging radiation probes.

SUMMARY OF THE INVENTION

In its broadest aspect, the invention provides a radiation flux imaging system comprising: non-imaging radiation detection means; position sensing means, to detect the position and orientation of said radiation detection means; processing means to process position and orientation data from said position sensing means, the presence or absence of contact from said contact sensing means and local radiation flux from said radiation detection means to determine the surface geometry of a surface to be imaged and the corresponding field of radiation flux; and display means, to display said geometry and radiation flux field to a user.

Preferably, the system further comprises contact sensing means, to detect contact of said radiation detection means with a surface to be imaged.

In any aspect of the invention, paid processing means preferably further includes means to identify positions corresponding to inadequate data collection, and means to communicate those positions to a user, in use.

In any aspect of the invention, the system preferably further comprises means to bias said radiation detection means away from a surface to be imaged, and processing means to calculate the depth of a radiation source below said surface to be imaged by comparison of the local radiation flux in the biased and unbiased positions.

In any aspect of the invention, the system preferably further comprises means to mark the surface to be imaged.

In any aspect of the invention the position sensing means comprises a plurality of position sensing means, fixed relative to each other, and the processing means further comprises means to compare the measured relative positions of the said plurality of position sensing means, thereby providing an identification of position measurement errors.

In any aspect of the invention the processing means identifies any radioactive source with an activity above a pre-set level and displays the position(s) of those/or that radioactive source(s) on the display means.

Preferably the pre-set level is determined by the processing means and is a proportion of the activity level from the radioactive source with the highest activity level.

The scope of the invention also includes a radiation flux imaging system substantially as described herein, with reference to and as illustrated by any appropriate combination of any accompanying drawings.

DESCRIPTION OF PREFERRED EMBODIMENTS

Figure 1:
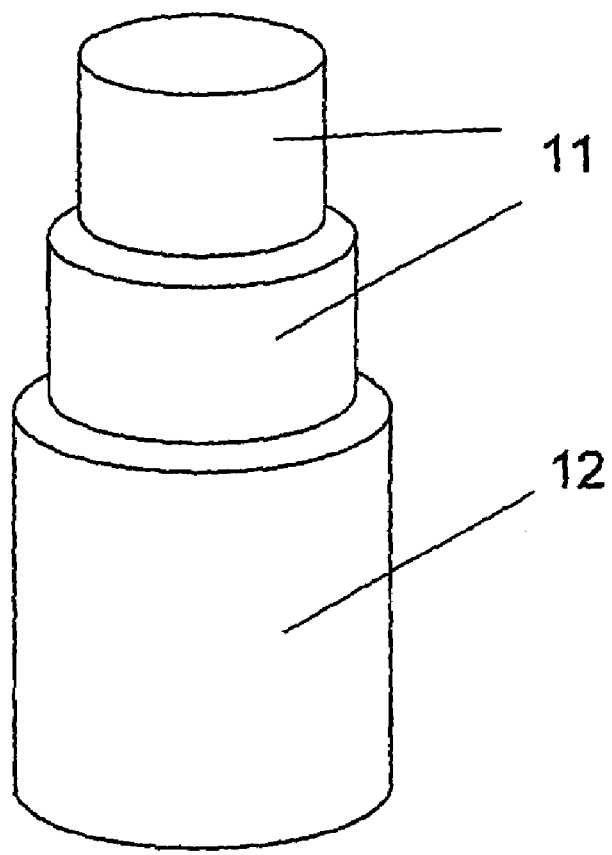
FIG. 1 shows a probe and a spacer suitable for biasing the probe a fixed distance from a surface to be scanned.

Non-imaging radiation detection means suitable for use in such a system are known in themselves, and would include a gamma detector, or, more generally, any device capable of detecting ionising or non-ionising radiation (e.g. scintillation detection, solid state detection, photodiode or the like). Such detection means provide a signal related to incident radiation flux from a defined geometrical volume of acceptance. That is, the device will generally have a field of view that is defined, perhaps by collimation.

Position sensing means suitable for use in such a radiation flux imaging system are known in themselves and provide data enabling the location and orientation of the radiation detection means to be determined. Such means provide three-dimensional co-ordinates of a reference point on the probe, together with angular information relative to at least two orthogonal axes, so allowing the interrogated volume of the radiation detection means to be determined.

Such sensing means, or three-dimensional localisers, include those mechanical, electromagnetic, optical, acoustic and other systems known in the art. To guide the skilled man in selection of a suitable position sensing means, attention should be directed at the available accuracy of position information, and the data-generation rate of the localiser. Care should also be exercised to ensure the localiser has adequate spatial and angular resolution. Typically, the accuracy of data required will depend upon the application but should be approximately twice that of the final image resolution required. For example, for a 5 mm image spatial resolution, a localisation of accuracy of 2.5 mm or better is preferred.

Again, the rate of data generation from the device will depend upon the rate at which the probe is to be moved across the surface. This, in turn, will depend on the characteristics of the radiation intensity and radiation detection means. For example, a radiation detector having a rate constant of about 1 second will need geometrical position data at least every 1 second, and ideally at twice that rate.

Contact sensing means are used in this system to detect contact of the radiation detection means with a surface to be imaged, Such contact sensing means are, of course, known in themselves. Suitable means include pressure sensing means such as a switch or electrical contact, or could equally comprise detection of resistance between electrical contacts, or the response of a photoelectric detector. Such photoelectric detectors could also conveniently contribute to the position sensing means by use of technology commonly found in the optical sensors of computer 'mouse' input devices, to increase the accuracy of the position sensing means or as a means of checking the change in position of the probe calculated from the position sensing means.

Processing means to process the position and orientation data, the contact data and the local radiation flux data to determine surface geometry of a surface to be imaged and the corresponding field of radiation flux may be conveniently provided by appropriate computer software. A wide range of embodiments providing this means may clearly be developed without further inventive thought, given the following general description and guidelines. Data from the probe position and local rate of radiation flux are combined to form a dataset embodying the spatial distribution of local radiation flux detected by the probe. To determine the image corresponding to the surface geometry of the surface to be scanned, a signal is generated indicating the start of data collection, by, for example, pressing the probe (i.e. the radiation detection means) onto the surface to be imaged to activate the contact detection means located on the probe. Such a signal could, of course, be generated in other ways, for example by a button press, computer command or vocal command from a user.

The processing means can optionally have the facility to combine geometrical or radiation flux data with already-collected data or to commence a new scan. Where the data is 'added' to an existing image, signal processing and filtration means known in the art may be conveniently used to combine new data with data already collected at corresponding locations. It is also preferable, especially when adding data to an existing scan, to identify the fixed reference points on the surface to be scanned, and for these reference points to be checked by the operator activating the contact sensing means onto each reference point in turn. These reference points could conveniently comprise either anatomical features or have been marked on the surface prior to scanning. This will establish the geometrical alignment of existing current scan data positions. For non-rigid bodies, e.g. humans being scanned during surgery, immobilisation may also be advisable (or, for anaesthetised patients, care by staff not to move the patient).

The processing means may calculate the radiation flux intensity and, when combining a current scan with a previous scan, the processing means should preferably check that the fields of view at each location are compatible, e.g. that at a certain surface 3-D position the detector field of view overlaps (to a pre-defined level of tolerance) between the previous and current scans. Non-overlap may be caused by different angular orientations of the probe between the two scans. The required level of overlap of the fields of view are set depending upon the spatial resolution required in the final image. For example, for a probe scan requiring 5 mm spatial resolution for a radioactive point source at 30 mm distance from the probe tip, the angular tolerance between the fields of view is 9.5°. The processing means can therefore identify and reject data outside a certain geometrical position repeat tolerance, and signal to the operator that the scan angle is not acceptable. For example, as an embodiment of the invention, when scanning a surface a simple protocol for the processing means would be to request the operator to scan with the probe perpendicular to the surface to be scanned, and in the event of repeat non-matching scan probe angle the system would prompt the operator to re-scan perpendicular to the surface.

The process of adding or averaging scans is highly preferable to build up image information for situations with relatively low count rates and to gain complete coverage by the operator of the area in which the sources of radiation may be located. In this way, the system can prompt the operator to add scan data to clarify a particular area by adding more data and thus gain better statistical precision.

The processing means collects data from the position sensing means and the contact sensing means to form a dataset embodying the coordinates of the surface to be scanned. As the probe is moved over the surface to be scanned (e.g. a patient's skin) the processing means determines a boundary of the area that has been mapped, for example by linking points to form a perimeter. Within this perimeter the processing means may check for sufficient data density (this may depend upon the characteristic of the surface topology of the surface to be scanned). Areas of the surface that have insufficient data sampling density may thus be identified.

In order to maintain a register between newly scanned points, and those already present in the dataset, it will be useful for the processing means to identify a number of datum points corresponding to locations on the surface to be scanned. These points may be conveniently provided by the operator marking the surface before use, or alternatively by the use of anatomical features inherently present on the surface. Alternatively, the probe may be equipped with means for marking the surface. At the simplest level, this may comprise the simple provision of a marking pen that may be extended and retracted within the body of the probe. In more complex embodiment, such a marking means may comprise an automated printing device, such as that found on ink jet printers. Such a device may then automatically mark the surface to be scanned with datum points, as well as providing an option for display of the radiation flux data collected by the system.

The display means, optionally driven by at least part of the processing means, may take the dataset comprising the surface geometry of the surface to be scanned and display this as e.g. a wire-mesh or other type of pseudo-3D display on a computer screen, possibly and preferably in real-time as the surface is scanned. Preferably, an indication representing the position and orientation of the probe is also displayed on the display means.

Also, the local radiation flux at any probe location and orientation is also preferably displayed, e.g. as intensity or colour at a point on the display means corresponding to the location of that flux. The mode of presentation of the image, and in particular the coordinates of the computer display image on a two-dimensional screen and the 'real-world' coordinates may not necessarily be linearly related, e.g. the displayed image may represent a pseudo-3-dimensional display of the radiation flux passing perpendicularly from a surface, such as the radiation flux emitted from a body surface and detected with a probe approximately perpendicular to the surface.

The system may also be used to estimate the depth of a source based upon the change in count rates with distance from the object's surface. The count rate at the surface over a centre of radioactivity is recorded, and the probe is moved to a fixed distance from the surface, whilst still pointing in the same direction. This may be accomplished by the use of a spacing device that may be set to bias the probe a fixed distance, (typically 10 to 20 mm), from the surface being scanned. Alternatively, the probe may be constructed in such a way as to automatically bias the detector from the surface to be scanned, for example under the control of the processing means.

The change in recorded count rate depends upon the depth of the source below the surface, and by calibration for the given isotope the change in counts can provide an estimate of source depth. The 3D probe read-out enables the exact position and direction of view of the probe, overcoming a major difficulty of implementing this without probe position information. The user can be prompted to maintain correct probe alignment, and the system can take the exact distance change achieved between the two probe positions rather than a nominal unmeasured distance. This method requires an isolated small source ("small" defined relative to the spatial resolution of the probe, ideally with a source size of less than or equal to half the full width half maximum of the probe spatial resolution), within a low background (relative to the source activity). Background count rate measurements may also be made to allow for correction.

When the probe is moved a fixed distance, 10 to 20 mm, from the surface being scanned by a spacing device as part of the procedure for determining the depth of an isolated source of radioactivity, if a user applies a different pressure to the probe then the change in distance of the probe may not correspond to actual space introduced by the spacer. This error in distance will introduce a corresponding error in the estimation of the source depth, since the reported depth will be assumed to be the depth from the un-distorted skin surface. For example, if the use of the probe in the manner described is used to report a depth of the node of D mm below the skin surface, then this is below the un-distorted skin surface. A surgeon later making the exploration to find the source will plan the operation relative to the un-distorted skin The ability to monitor and record the actual 3D location of the probe during the probe measurement therefore allows correction for errors which would arise from the probe tip being too near or far from the source (i.e. too pressed in or not touching the surface, as well as being able to monitor that the probe is directly over and pointing at the localised source. If the position or the angle of the probe is outside of specified tolerances then the data collection can be stopped and the user be alerted. Note that the position of the undistorted skin surface can be identified by reference to the earlier skin surface scan, and possibly additionally prompting the user to place the probe on the skin with no applied pressure, and to then signal to the data collection system that this is the reference position of the skin surface to be used in the depth correction calculation. Any mismatch between a first scan and a subsequent scan (with the probe being moved a fixed distance from the surface by a spacer) indicating an error due to the application of pressure to the probe while taking one of the scans can be identified by the processing means and the surgeon (or operator) alerted and directed to re-take the appropriate scan.

We note that the additional accuracy provided by this means may then be used to direct minimally-invasive biopsy by means of a remote cutting and tissue sample collecting tool, the use of which is only possible if there is accurate 3D localisation of the target tissue. In this case errors of only a few mm may be significant in order to remove the correct tissue sample.

In surgical exploration, the surgeon may need to estimate the relative activity in a source hidden below tissue. For example, in sentinel node surgery for cancer staging, the procedure may require the removal of all radioactive tissue containing an activity above a given percentage (proportion), say 10%, of the hottest source (hottest lymph node). The surgeon removes the hottest node and then searches for other sources of activity. If the gamma probe registers a given count rate in a further source in tissue, this count rate cannot be used to estimate the activity in the new source relative to the hottest source unless the probe-to-source distance is known. The only situation in which this distance is not required is if the new count rate is at or above the given threshold, since the distance effect always reduces the detected count rate. Applying the method of depth estimation described above therefore allows a simple correction for depth to be applied so that the relative activity in the new source, relative to the hottest source removed, can be estimated. This is a major benefit since further dissection can be avoided if the activity is below the threshold, or the source can be removed by further surgical exploration if it is above the activity threshold. This system provides a means by which a surgeon can identify the relative activities in sources at depths in tissue, to enable the application of operating procedures based upon this information.

By re-scanning the entire surface with the spacing device in place, the system produces an image of the type previously described in the absence of the spacing device. The system again ensures adequate tolerance between the angular alignment of the probe at a given (x,y,z) position (i.e. so that both are within given tolerance from perpendicular to the skin surface). The system then compares count rates between the two collected images in order to estimate the depth of any sources. In this way, errors introduced due to the application of varying pressures to the skin via the probe by an operator are reduced.

Additionally, the system may incorporate the following features:

1. An algorithm to identify any focal regions of increased radioactivity above background, either automatically by image processing and analysis by standard means or by the user identifying relevant regions on the images by use of a mouse or other suitable alternative means.
2. Subtraction of any background surrounding the areas containing a source can be carried out, to leave images showing only areas where there has been a change in count rate due to the presence of a source.
3. Depth estimation of each identified area containing a source, by the previously described means of comparing the count rates in the two images (the surface scan and the scan taken with the spacer in place), with reference to a look-up calibration table or a standard formula.
4. The depth of sources can then be displayed as an end in itself to aid surgical localisation, or can be used to improve the final image obtained.
5. A part of the image with a source at an estimated depth is identified and standard image deconvolution can be applied to remove the effect of the imperfect imaging system Point Spread Function (PSF). The PSF is found by reference to the probe spatial resolution as a function of depth, with the depth given by the above method.

6. It should be noted that each identified area containing a source is potentially at a different depth, so this deconvolution procedure must be carried out at each source location, and then the resulting sharpened image elements may re-combined to give a sharper whole image if required (i.e. the image is taken apart into smaller sub-images, sharpened by deconvolution and then put back together).

Imaging systems of the type described herein are vulnerable to interference from other items of equipment and especially those containing magnetic sources. This is a problem for all such imaging systems that use 3D position localisers but is a particular problem for localisers that utilise electromagnetic methods of position location. Systems of the type described herein are likely to be used in operating theatres where various items of equipment are present which generate local magnetic fields or contain magnets. The use of photoelectric detectors as previously described only allow for the checking of local changes in position rather than checking the absolute position of the probe. It is for this reason that the system described herein may incorporate two position sensors located rigidly on a body or handle of the probe. The system is calibrated such that the position of the tip of the probe can be calculated relative to the two sensors if desirable. The system can thus constantly monitor the relative position of the two sensors and may additionally monitor the other 3D information available e.g. the three orthogonal spatial co-ordinates and three rotational angles previously used to describe the probes position and orientation). In this way, a change in the local magnetic field (caused by bringing a magnetised object close to the probe) would result in a variation in the monitored relative position of the sensors relative to each other and/or a variation relative to the other 3D information—if being used. Such a variation in detected position would result in the activation of an alarm and/or data collection could be automatically stopped. This system therefore detects errors relating to magnetic effects on the probe. If the effect of the field is identical on each sensor the effect may not be detected but this is highly unlikely due to the spatially varying nature of magnetic field effects.

Figure 2:
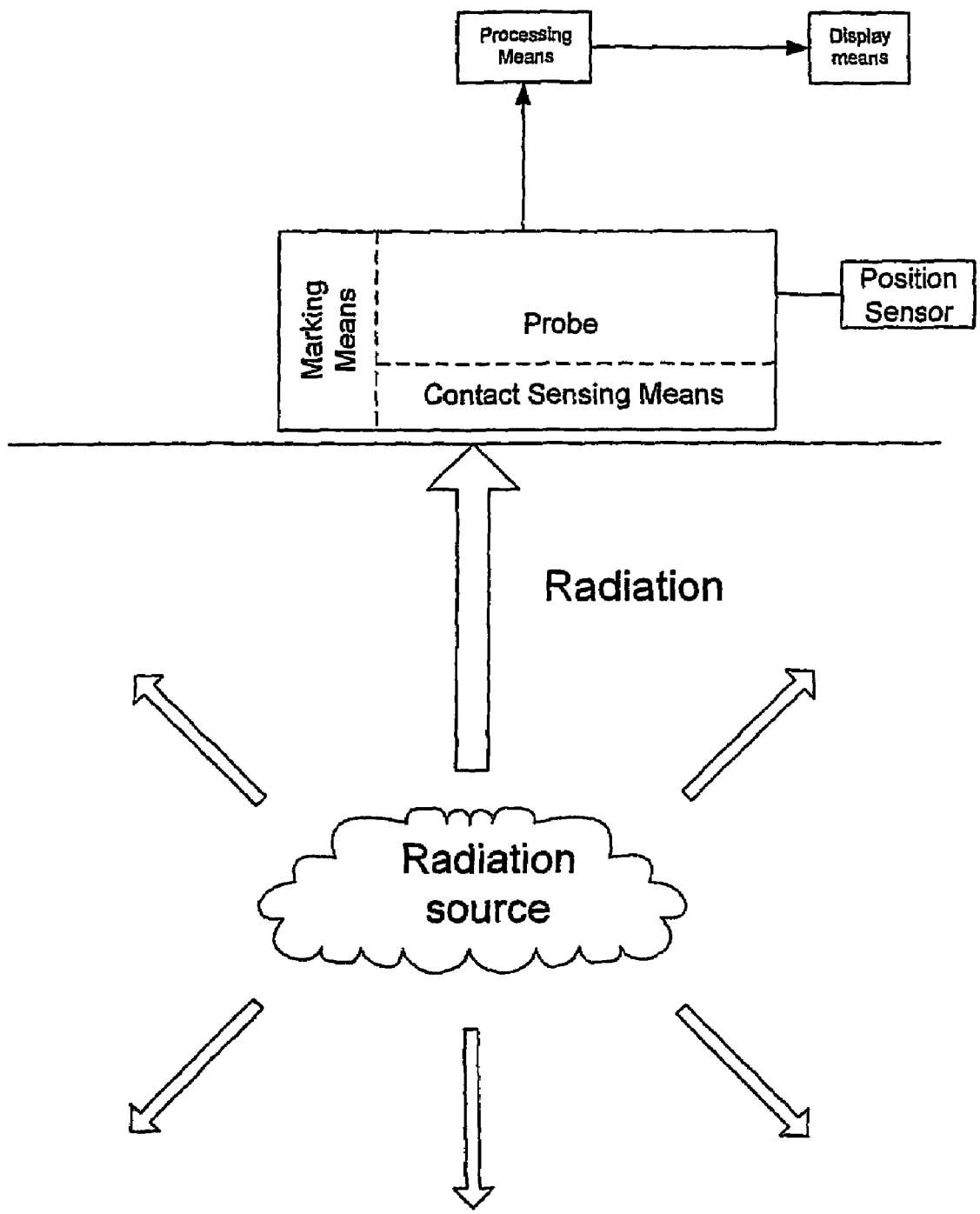
FIG. 2 is a flow chart showing schematically the operation of the invention described herein.

FIG. 2 is a flow chart showing schematically the operation of the invention described herein.

Operational Guidelines

In order to further assist the skilled addressee, the following guidelines are offered to describe the operation of an embodiment of the invention described herein.

For the sake of clarity only, the guidelines are presented in relation to the application of scanning a patient's skin using a gamma counter. A similar approach can be taken at any body surface, e.g. during abdominal surgery the internal abdominal cavity may become the surface being geometrically mapped and imaged. There are, clearly, other ways of accomplishing the desired aims within the scope of the invention, whose details will differ from those set out below.

The system described may consist of computer for operator control and data calculation and store, and a 3D position sensitive device attached to the intra-operative gamma probe. The 3D information includes three orthogonal spatial coordinates and three rotational angles to completely describe the probe position and orientation. The sensor is mounted on the gamma probe and returns coordinates of the position of the mounting. The probe tip position is then calculated from the dimensions of the probe and the sensor position.

The overall procedure is to map the geometric surface of the patient, then to use free-hand scanning with the intra-operative probe to build up an image corresponding to the radiation flux at the skin surface. Geometric reference points may be used to check for patient movement during the procedure.

(1) Setting and Using Geometric Reference Points on the Patient's Skin.

a Enter reference point collection mode on the computer— e.g. by clicking on a start button b. Reference points may be made to detect any overall patient motion during the procedure.

c. The user may make any number of pre-defined surface points on the patient's skin—e.g. three ink marks identified as A, B, C.

d. The probe tip is placed on an identified mark (say B) and a signal sent to the computer to identify that it is on a specified mark, say by clicking on a button on the computer. When the point is identified the 3D position of the probe tip is calculated and stored as a reference mark position.

e. Each point is identified in turn. At any time during the subsequent imaging the user may select an option to check a reference point. When this check procedure is entered the user puts the tip of the probe on the skin reference mark and a signal is sent to the computer, say by clicking on a button on the computer. The computer then calculates the 3D position of the probe tip and compares this to the previously recorded probe tip position. The user is informed of any differences in reference and current position, and differences in excess of a preset tolerance may be used to identify significant patient movement. Normal physiological motion (e.g. breathing), body surface flexibility and probe spatial resolution are taken into account in setting tolerances for the reference and current location of appoint to be compared. The system may be set so that new reference positions must be identified before image data collection can continue. Image data collected up to this point may be abandoned, or stored labelled as possibly subject to patient movement errors.

(2) Mapping the Physical Location of the Surface of the Patent a Enter a geometrical surface map collection mode on the computer—e.g. by clicking on a start button.

b. The operator puts the probe onto the skin surface and signals to the computer to start collecting 3D position information. A pressure sensitive probe tip surface may be used to identify when the probe is in contact with the skin surface so that 3D data is collected whilst pressure is identified.

c. The probe is moved over the skin surface, covering the area to be mapped for radioactivity.

d. The 3D data points on the surface may be used to display a wire-mesh or other type of pseudo-3D display on a computer screen, possibly in real-time as the surface is scanned.

e. The computer determines a boundary of the area which has been mapped by linking points to form a perimeter. Within this perimeter the system checks for a sufficient data density (e.g. surface data is required at least at 10 mm spacing—this will depend upon the particular body part being mapped, depending on the rate of change of surface orientation). Surface areas which have insufficient data sampling density may be highlighted on the pseudo-3D display—for example by showing the interpolated surface in a contrasting colour where it is undersampled. The position of the probe tip can be shown in real-time on the emerging pseudo-3D surface display as a guide for the operator of where they are currently sampling.

f. The surface mapping is not accepted by the computer till a preset data sampling density is achieved.

g. The operator must keep the probe in contact with the skin surface until the mapping is finished, which the operator can signal to the computer by clicking a button. If a pressure sensitive contact device is used on the probe tip then this will signal when data is not to be collected, and the operator can stop the mapping stage.

h. It may assist accuracy by re-identifying the surface marker points at the end of mapping, as this will give a measure of the reproducibility of positioning. The system may be set to require the operator to do this before proceeding.

i. The surface coordinates are stored by the computer, and it may be advantageous to interpolate these free-hand sampled points to points on a regular grid. This may assist in looking up surface positions during the imaging stage of the process.

(3) Image Formation a. The user signals to the computer system that the mode of image formation is being entered, say by clicking a button on the computer.

b. The user puts the probe in contact with the patient's skin within the area previously which has been scanned for surface position A real-time display on the computer screen of the probe tip relative to the scanned skin surface may be useful to guide the operator to the surface area to be scanned to form the image.

c. It may also be helpful for a warning signal to sound unless the probe tip is calculated to be within a predefined distance of the pre-scanned skin surface. This predefined distance is set taking into account the expected skin motion due to physiological factors (e.g. breathing), skin flexibility and likely changes due to the operators hand control affecting the pressure of the probe against the skin, and the spatial resolution of the gamma probe (it is likely that this positioning tolerance will be of the order of +/−5 mm for current systems). If the probe is equipped with a pressure sensitive device, this may also be used to provide some information, but valid data may still be collected with the probe not touching the skin surface given the considerations on resolution and accuracy stated above.

d. The probe angulation to the pre-mapped skin surface will also be calculated, and a warning signal may be given by the computer if the probe is more than a preset tolerance from perpendicular to the skin surface. This tolerance will be set dependent upon the spatial resolution of the probe, the estimated average distance of the target activity, and the desired final spatial resolution of the final map of radioactivity.

e. During image formation the current position of the probe may be displayed on the pseudo-3D surface map as a guide to the operator.

f. When the probe is in a correct position (on the skin surface within the geometrically mapped area), and perpendicular to the skin surface (or within a predefined angular range from true perpendicular), the count rate information from the probe is captured by the computer and stored within the computer, together with the 3D spatial coordinates of the probe tip and probe angulation information. The time is also recorded, so that there is a record of probe position and angulation and count rate, or number of counts, at a given time point and within a given time duration around that time point. For example, at a time T after the scanning has started a number of counts C is recorded within a time T to (T +dT). dT may be set so that in this time interval movement of the probe is likely to be small compared with the spatial resolution of the system (eg 0.5 s), or dT may be a variable window set by monitoring the movement of the probe in real-time. For example, the count rate is accumulated until the system detects movement of the probe tip by more than a preset amount. This is likely to be of the order of a few mm, given the requirements for spatial resolution of the final image.

g. The accumulated count rate and position information may then be displayed on the pseudo 3D surface map of the skin. A colour or intensity variation look-up table is used to display the average count rate per unit time at a particular location. The statistical precision of the count rate image may be improved by re-measuring the count rate at a spatial location, and a mode of operation would be for the user to do a coarse scale and relatively rapid scan of the surface and then continue to move the probe over the surface in areas in which sources of activity appear to be present. As points are re-measured the new count information is combined with previous total counts recorded at that location and averaged over the total measurement time to achieve a new and less statistically variable estimate of the average count rate at a spatial location.

h. Data collected at one spatial location may be added to the image over a defined area according to the known spatial response characteristics of the probe. This requires that the depth of the source is assumed, since the spatial response characteristics of the probe change with source depth. This may not be possible for all applications, but it may be reasonable to take a source depth of 30 mm (or similar) for lymph node localisation. Furthermore, it may be valuable to produce several images corresponding to several assumed depths.

i. It may be possible to produce a more accurate estimate of the source distribution by applying deconvolution of the known point spread characteristics of the probe. This requires that the depth of the source is assumed, since the spatial response characteristics of the probe change with source depth. The success of such deconvolution will depend upon having data with low statistical variability, and how accurate the assumption of source depth is. For situations in which there are a number of discrete (e.g. less than 10 mm dimensions) sources of radioactivity, it may be possible to estimate the depth (see depth estimation methodology) and use this information to perform a better deconvolution of the point spread function. This is a direct benefit of source depth estimation to the imaging process.

j. The user may benefit from guidance to indicate which areas have high statistical uncertainty, and therefore which may benefit from further count rate measurement. This may be achieved by pseudo-3D display of an image of the skin surface with the percentage error in the surface count displayed on a variable intensity or variable colour scale. Areas with no collected count rate information can also be displayed in a contrasting manner as a guide to the user.

k. The collection of the image data may be terminated at any point by the user, for example by clicking on a button on the computer.

l. It may be useful as a check to ask the user to identify the geometric reference marks as a check on whether there has been patient movement between the start and end of the procedure, outside of the specified tolerances.

(4) Estimating the Depth of a Radioactive Source.

Figure 1A:
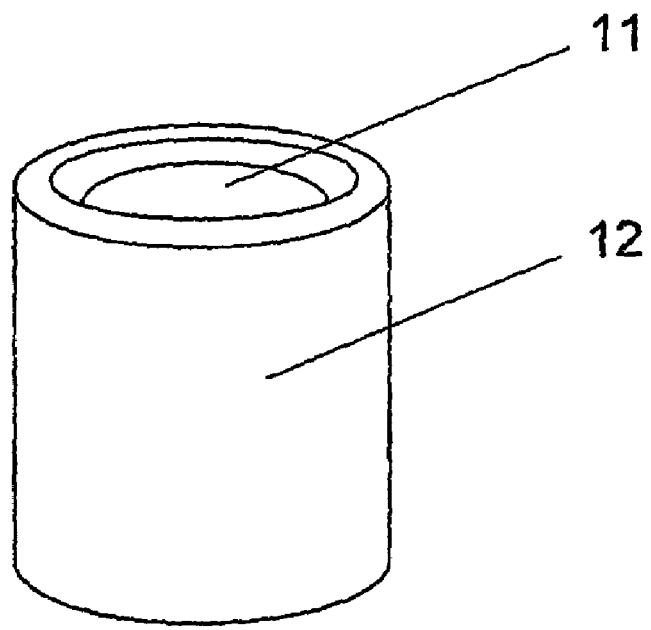
FIG. 1a shows a probe in a position where it is in contact with the surface and is retained within the spacer.

As above, this procedure is described for an isolated source of size typically much less than the spatial resolution of the gamma probe (e.g. 10 mm dimensions or less). Possible modifications to deal with larger sources are suggested.

a. The position of a source within an object may be estimated by producing an image from a non-imaging gamma probe (as described elsewhere), or by scanning with the probe in a traditional non-imaging mode to detect the position corresponding to the maximum count rate. Since this depth estimation procedure requires a 3D tracking device to be used to localise the probe position, the depth estimation may be seen as an extension of the same probe imaging system, or it may be a device simply for depth estimation.

b. The probe is positioned over the identified position of the source (that is, the position with the maximum count rate). The user may be guided by an image produced by the probe imaging system. The user moves the probe so that it is estimated to be perpendicular to the surface. The user then signals to the computer that a surface measurement is to be made. The 3D coordinates and angulation of the probe are read by the computer, and if a geometrical surface map of the object has been produced a check made against this geometric data to see if the probe is within a defined range from perpendicular to the surface, and that the tip is on the surface; the user may be warned if the probe position does not seem to be within the predefined limits.

c. The user signals that the surface count can begin, and the counts from the gamma probe are recorded for a set time period, or a set number of counts are recorded and the time duration of counting is noted The system also logs the 3d Position and orientation and counts in small time durations (say 0.5 sec) during the total counting duration and stores this data d. The probe is then moved away (biased) from the surface along the perpendicular to the surface by approximately one centimeter. This may be achieved by having a simple cap fitting over the end of the probe which has a "zero position" to allow the probe tip to be close to the surface, and a position which moves the probe tip 1 cm further away from the end of the cap which is kept in contact with the surface (See FIGS. 1 and 1a). FIG. 1 shows a probe 11 and a spacer 12 suitable for biasing the probe a fixed distance from a surface to be scanned, wherein the probe 11 is biased away from the surface by the spacer 12. FIG. 1a shows the probe 11 in a position where it is in contact with the surface and is retained within the spacer 12.

e. Other means of positioning the probe tip may be used (as discussed above).

f. The 3D positioning system reads out the position and angulation of the probe, and the computer checks that these are within pre-defined limits.

g. The user signals that the "1 cm" reading can begin, and the system records the counts from the gamma probe for a set time period, or a set number of counts are recorded and the time duration of counting is noted. The system also logs the 3d Position and orientation and counts in small time durations (say 0.5 sec) during the total counting duration and stores this data.

h. During counting the computer continuously monitors the probe position and orientation as stated above, and only counts collected within a predefined range of probe position (e.g. on the surface and over the identified source position and perpendicular to the surface) are accepted to form the mean count rate at the surface (Cs counts/second) or at 1 cm distance (Cd counts/second).

i. The expected change in count rate for a given probe and positioning device are known by calibration (repeating the above procedures with the radioisotope in use at different source depths in water, or other media giving equivalent attenuation and scatter to the material the source is located in, eg soft tissue).

j. From the calibration curve relating source depth to change in count rate the depth of the source is estimated.

k. Improvements may be possible if there is significant and relatively uniform background activity in the material. The counting procedure is repeated on the surface and at a distance over an area with similar background, but away from the influence of the source. These count rates are subtracted from the source surface and distance count rates before the calibration ratio is calculated or looked up to estimate the depth.

(5) Using the Source Depth Information a. The depth estimate may guide surgical planning in lymph node localisation, or in surgical resection of a tumour which has had a marker radioactive source placed within it.

b. The depth information may also help in improving the image produced by the scanning probe, since depth information allows a better estimate of the gamma probe point spread response function to a source at that depth, which may then be used in deconvolution of this imperfect response to improve the spatial resolution within the image.

The invention will be defined by the claims that follow.

The invention claimed is:

1. A radiation flux imaging system comprising:
a non-imaging radiation detection device;
a position sensor, to detect the position and orientation of said radiation detection device;
a contact sensor to detect contact of said radiation detection device with a surface to be imaged;
a processor to process position and orientation data from said position sensor, the presence or absence of contact from said contact sensor and local radiation flux from said radiation detection device to determine the surface geometry of a surface to be imaged and the corresponding field of radiation flux; and
a display to display said geometry and radiation flux field to a user.

2. A system according to claim 1, wherein said processor is configured to identify positions corresponding to inadequate data collection, and to communicate those positions to a user, in use.

3. A system according to claim 1, further comprising a biasing device to bias said radiation detection device away from a surface to be imaged, and a processor to calculate the depth of a radiation source below said surface to be imaged by comparison of the local radiation flux in the biased and unbiased positions.

4. A system according to claim 1, further comprising a marking device to mark the surface to be imaged.

5. A system according to claim 1, wherein the position sensor comprises a plurality of position sensors, fixed relative to each other, and the processor is configured to compare the measured relative positions of the said plurality of position sensors, thereby providing an identification of position measurement errors.

6. A system according to claim 1, wherein the processor identifies any radioactive source with an activity above a pre-set level and displays the position (s) of those/or that radioactive source (s) on the display.

7. A system as claimed in claim 6, wherein the pre-set level is determined by the processor and is a proportion of the activity level from the radioactive source with the highest activity level.

* * * * *